(12) United States Patent
Li

(10) Patent No.: US 7,596,060 B2
(45) Date of Patent: Sep. 29, 2009

(54) MULTI-DISC PLAYER TESTING APPARATUS AND METHOD

(75) Inventor: Li-Dong Li, Guangdong (CN)

(73) Assignees: Hong Fu Jin Precision Industry (ShenZhen) Co., Ltd., Longhue Town, Bao'Aan District, Shenzhen, Guangdong Province (CN); Hon Hai Precision Industry Co., Ltd., Tu-Cheng, Taiepi Hsien (TW)

( * ) Notice: Subject to any disclaimer, the term of this patent is extended or adjusted under 35 U.S.C. 154(b) by 735 days.

(21) Appl. No.: 11/308,613

(22) Filed: Apr. 12, 2006

(65) Prior Publication Data

US 2007/0064550 A1 Mar. 22, 2007

(30) Foreign Application Priority Data

Sep. 21, 2005 (CN) .................. 2005 1 0037470

(51) Int. Cl.
*G11B 7/085* (2006.01)
(52) U.S. Cl. .................. 369/30.91; 369/30.86
(58) Field of Classification Search ............ 369/30.86, 369/30.91, 30.56, 30.62, 30.79, 30.71, 30.84, 369/30.89, 30.36, 30.96, 30.98; 720/606
See application file for complete search history.

(56) References Cited

U.S. PATENT DOCUMENTS

| 5,115,419 | A | 5/1992 | Akiyama et al. |
| 5,742,571 | A | 4/1998 | Hoshino et al. |
| 5,777,957 | A | 7/1998 | Lyman |
| 7,069,565 | B2 * | 6/2006 | Hirano ............. 720/606 |
| 2004/0095854 | A1 | 5/2004 | Woo |

* cited by examiner

*Primary Examiner*—Ali Neyzari
(74) *Attorney, Agent, or Firm*—Winston Hsu

(57) ABSTRACT

A multi-disc player testing apparatus for testing whether the multi-disc player satisfies the specific requirements is provided. The multi-disc player includes a carousel having multiple disc-accommodating areas and a disc-positioning sensor. The carousel defines a plurality of indicating slots for identifying each disc-accommodating area. The disc-positioning sensor scans the indicating slots to produce wave pulses in a form corresponding to the indicating slots. The multi-disc player includes a measuring module for receiving the wave pulses from the disc-positioning sensor, and measuring and comparing the number of the wave pulses and durations of each pulse with predetermined values to determine whether the multi-disc player satisfies the specific requirements.

16 Claims, 7 Drawing Sheets

MULTI-DISC PLAYER TESTING APPARATUS AND METHOD

FIELD OF THE INVENTION

This invention relates to disc player testing apparatuses and methods and, more particularly, to a multi-disc player testing apparatus and a multi-disc player testing method.

DESCRIPTION OF RELATED ART

Generally, a multi-disc player includes a carousel having multiple disc-accommodating areas. Each disc-accommodating area can accommodate a disc therein. Therefore, the multi-disc player can accommodate multiple discs therein and continuously reproduce all the discs accommodated therein without changing discs. In order to identify each disc accommodated therein, a disc-identifying unit is employed. A general disc-identifying unit identifies discs based on features of the disc-accommodating areas. The general disc-identifying unit includes a positioning sensor mounted inside the multi-disc player. When the carousel rotates, the positioning sensor scans the features of the disc-accommodating areas to obtain wave pulses. The form of the wave pulses depends on the features of the disc-accommodating areas and a rotating speed of the carousel. If the rotating speed of the carousel is abnormal, or the features of the disc-accommodating areas are not satisfactory, the disc-identifying unit may identify the discs in error, or may not identify the discs, making the multi-disc player unable to reproduce a selected disc. In order to distribute working products for the market, tests for testing characteristics of the multi-disc player are required to be done before the multi-disc player is brought into distribution.

Therefore, a testing apparatus and a testing method for testing a multi-disc player is desired.

SUMMARY OF INVENTION

A multi-disc player testing apparatus for testing whether a multi-disc player satisfies specific requirements is provided. The multi-disc player includes a carousel having multiple disc-accommodating areas and a disc-positioning sensor. The carousel defines a plurality of indicating slots for identifying each disc-accommodating area. The disc-positioning sensor scans the indicating slots to produce wave pulses in a form corresponding to the indicating slots. The multi-disc player includes a measuring module for receiving the wave pulses from the disc-positioning sensor. The measuring module then measures and compares the number of the wave pulses and durations of each pulse with predetermined values to determine whether the multi-disc player satisfies the specific requirements.

A multi-disc player testing method includes steps of: receiving wave pulses from a disc-positioning sensor of a multi-disc player, the wave pulses representing features of a disc-accommodating area of a carousel and consists of alternate high phrase pulse and low phrase pulse; measuring the number of the low phrase pulses and durations of each low phrase pulse; and comparing the number and durations with predetermined values to determine whether the multi-disc player satisfies the specific requirements.

Other advantages and novel features will become more apparent from the following detailed description of preferred embodiments when taken in conjunction with the accompanying drawings, in which:

DETAILED DESCRIPTION

Figure 1:
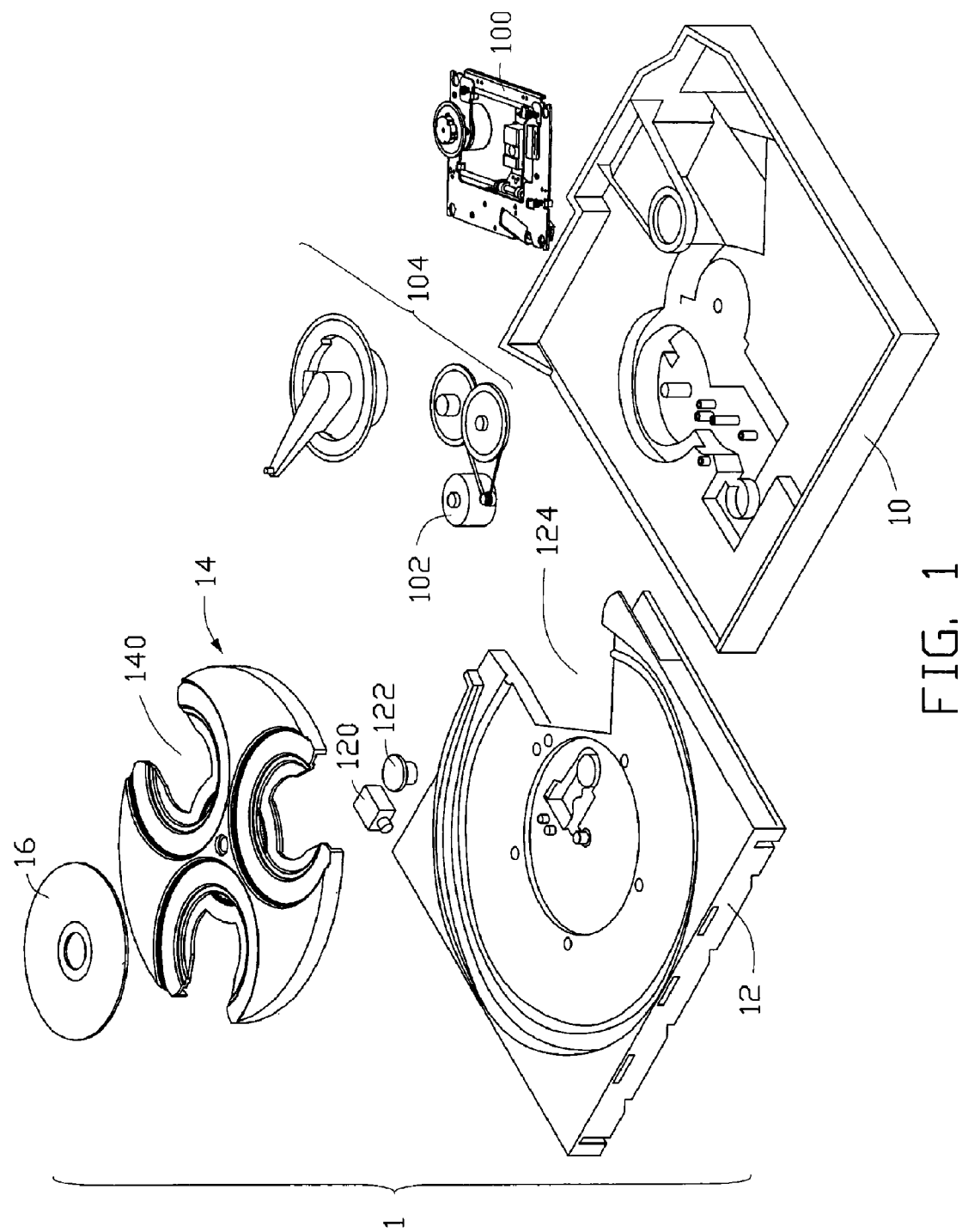
FIG. 1 is an exploded, isometric view of a general multi-disc player, the multi-disc player including a drawer.

A Multi-disc player accommodates multiple discs therein, such as three discs, five discs, etc. In the following embodiments, a triple-disc player is taken as an example for illustration. Referring to FIG. 1, a general multi-disc player 1 includes a base 10, a drawer 12 mounted on the base 10, and a rotatable carousel 14 mounted on the drawer 12 for supporting discs 16. A traverse module 100 is mounted on the base 10 for reproducing information recorded on the discs 16. A first driving device 102 is mounted on the base 10 for generating mechanical energy. A first transmission mechanism 104 engages with both the first driving device 102 and the drawer 12, and is used for transmitting mechanical energy generated by the first driving device 102 to the drawer 12 so as to drive the drawer 12 to move relative to the base 10. A second driving device 120 is mounted on the drawer 12 for generating mechanical energy. A second transmission mechanism 122 engages with both the second driving device 120 and the carousel 14, and is used for transmitting the mechanical energy generated by the second driving device 120 to the carousel 14 so as to drive the carousel 14 to rotate relative to the drawer 12.

The drawer 12 can move relative to the base 10 forming a closed position and an open position, and defines a cutout 124 at a corner thereof. When the drawer 12 reaches the closed position, the drawer 12 substantially overlaps the base 10, and the cutout 124 of the drawer 12 is aligned with the traverse module 100. Thus the traverse module 100 can be lifted up to support the disc 16 accommodated in the carousel 14. When the drawer 12 reaches the open position, the drawer 12 is partially extended out of the base 10 so that inserting or removing a disc can be performed.

The carousel 14 defines three disc-accommodating areas 140 arranged evenly at a periphery thereof. When a selected disc is to be reproduced, the carousel 14 rotates relative to the drawer 12 until the disc-accommodating area 140 for accommodating the selected disc is aligned with the traverse module 100.

Figure 2:
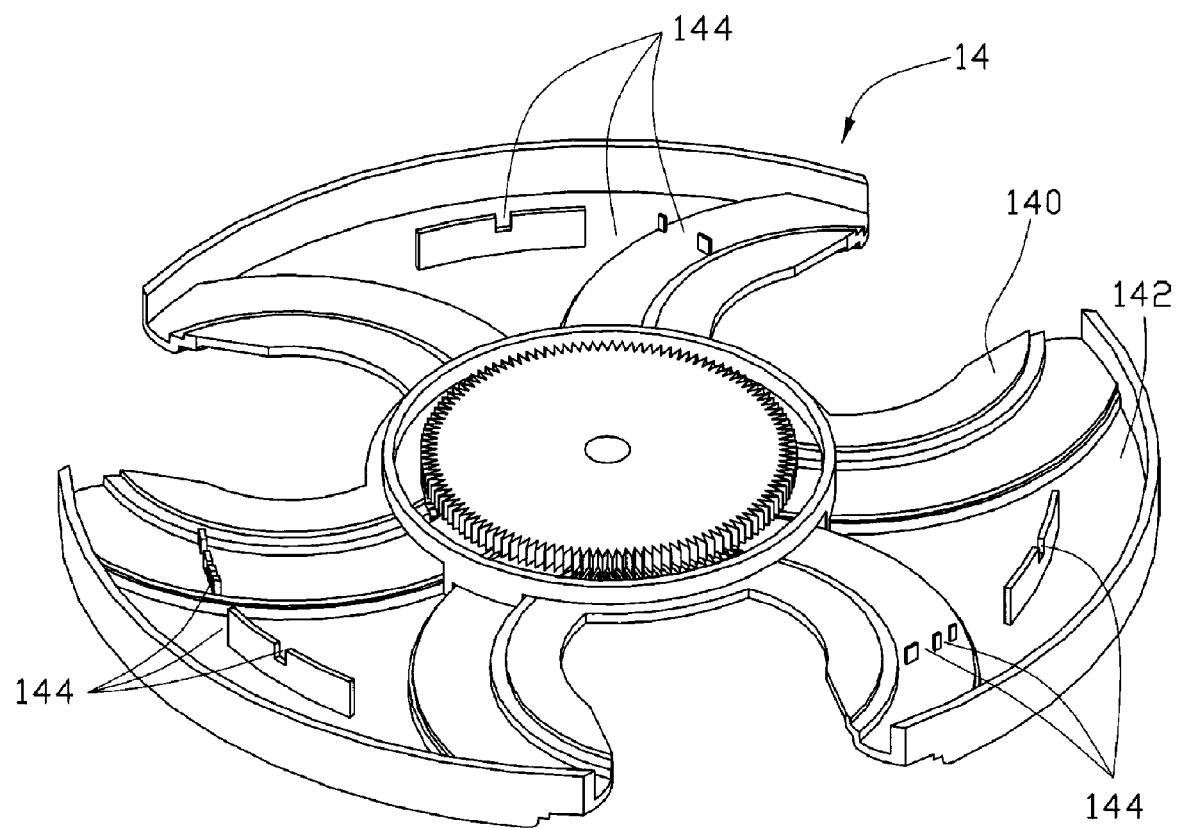
FIG. 2 is an inverted, enlarged view of the drawer of FIG. 1.

Referring to FIG. 2, the carousel 14 includes three connecting portions 142 each separately connecting a different set of two neighboring disc-accommodating areas 140. Each connecting portions 142 defines a plurality of indicating slots 144 in a backside thereof. The indicating slots 144 defined in each connecting portions 142 have unique physical attributes, including the number, shapes, and arrangements of the indicating slots 144. The physical attributes of the indicating slots 144 are used for identifying the discs 16 accommodated in the disc-accommodating areas 140. The disc 16 aligned with the traverse module 100 hereinafter is referred to as current disc. The position aligned with the traverse module 100 hereinafter is referred to as reproducing position.

Figure 3:
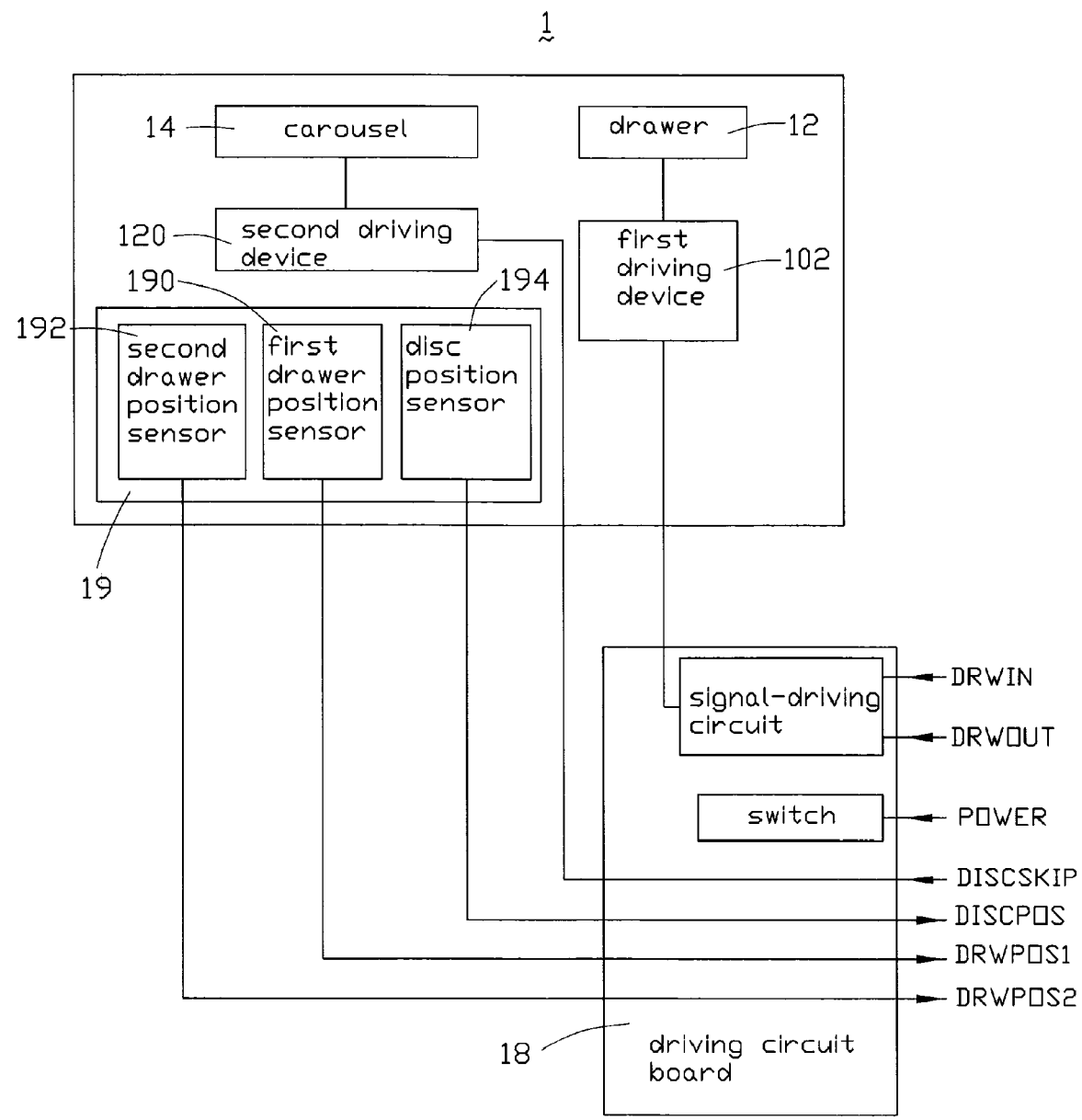
FIG. 3 is a block diagram of the multi-disc player of FIG. 1, the multi-disc player including a disc-positioning sensor.

Referring to FIG. 3, the multi-disc player 1 includes a driving circuit board 18 connecting to the first driving device 102 and to the second driven device 120, and a positioning sensor board 19 connecting to the driving circuit board 18. The positioning sensor board 19 includes a first drawer-positioning sensor 190 for detecting and determining whether the drawer 12 reaches the closed position (indicated by signal DRWPOS1), a second drawer-positioning sensor 192 for detecting and determining whether the drawer 12 reaches the open position (indicated by signal DRWPOS2), and a disc-positioning sensor 194 for detecting the features of the indicating slots 144 corresponding to the current disc. The driving circuit board 18 receives external controlling commands DRWIN, DRWOUT and DISCSKIP, and controls working states of the first and second driving devices 102 and 120. The driving circuit board 18 includes a first driving circuit 180 (shown in FIG. 5) for controlling the working states of the first driving device 102 and a second driving circuit 182 (shown in FIG. 5) for controlling the working states of the second driving device 120.

The commands DRWIN and DRWOUT are used for controlling the working states of the first driving device 102. Upon receiving the command DRWIN, the driving circuit board 18 controls the first driving device 102, driving the drawer 12 to move towards the closed position until receiving the signal DRWPOS1 that indicates that the drawer 12 reaches the closed position. Upon receiving the command DRWOUT, the driving circuit board 18 controls the first driving device 102, driving the drawer 12 to move towards the open position until receiving the signal DRWPOS2 that indicates that the drawer 12 reaches the open position.

The command DISCSKIP is used for controlling the working states of the second driving device 120. For example, the command DISCSKIP can be set to one of two values "0" and "1". When the command DISCSKIP is set to a first value "1", the driving circuit board 18 controls the second driving device 120 to drive the carousel 14 to rotate. When the command DISCSKIP is set to a second value "0", the driving circuit board 18 cuts off a power supply to the second driving device 120. Accordingly, the carousel 14 begins to slow down and stop rotating.

Figure 4:
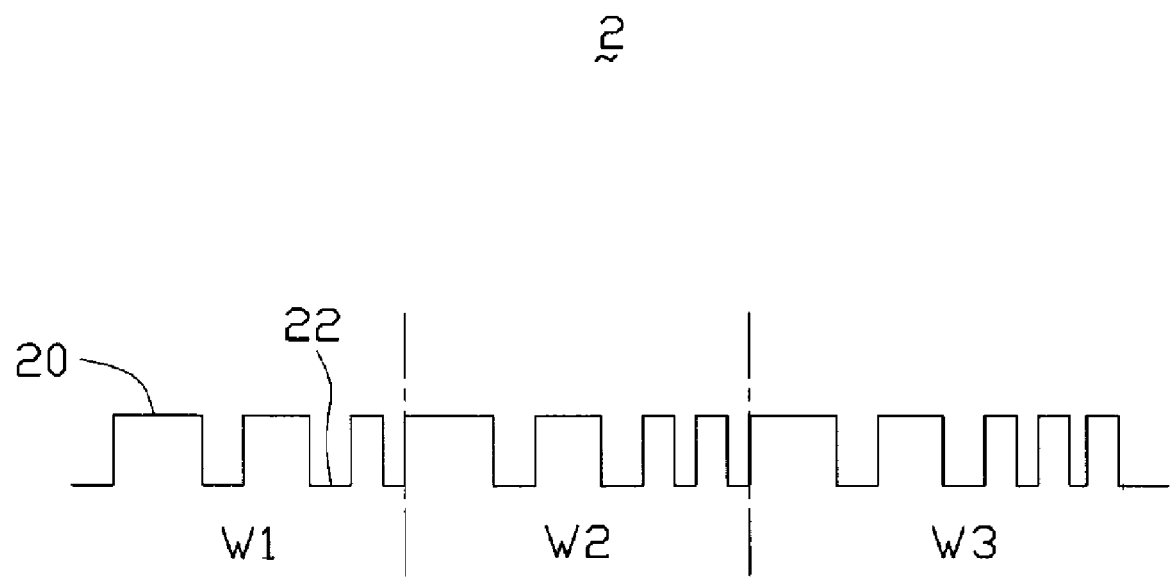
FIG. 4 is an exemplary view of wave pulses from the disc-positioning sensor.

A typical disc-positioning sensor 194 is a light sensor. The disc-positioning sensor 194 can produce wave pulses when detecting the indicating slots 144. The features of the wave pulses correspond to that of the indicating slots 144. Referring to FIG. 4, an exemplary view of the wave pluses 2 generated by the disc-positioning sensor 194 is illustrated. The wave pulses 2 include three portions, a first portion W1, a second portion W2, and a third portion W3, that corresponds to the indicating slots 144 defined in the three connecting portions 142, respectively. The three portions W1, W2, and W3 are used for identifying discs accommodated in their respective disc accommodating areas 140. Each portion of wave pulses is consisted of a plurality of alternate high phrase pulse 20 and low phrase pulse 22. The low phrase pulse 22 represents the indicating slots 144. Therefore, the number of the low phrase pulse 22 is equal to that of the indicating slots 144. A width of the low phrase pulse 22 is identical to that of a corresponding indicating slot 144. The number and durations of the low phrase pulse 22 should satisfy specific requirements that are set forth in a product specification. If features of the carousel 14 do not conform to some specific requirements, such as sizes thereof exceed predetermined values, or a rotating speed of the carousel 14 is abnormal, the wave pulses 2 may be abnormal, and the position of disc 16 cannot be identified properly.

The carousel 14 is driven to rotate by the second driving device 120 and the second transmission mechanism 122. Friction coefficients of the second transmission mechanism 122 may produce an unwanted effect on the rotating speed of the carousel 14 to be abnormal. If the friction coefficients exceed predetermined limits, the rotating speed may be slower than expected. In addition, a brake system of the multi-disc player 1 is also critical for the rotating speed of the carousel 14. Therefore, a multi-disc player testing apparatus for testing features of the carousel 14, characteristics of the brake system, and friction coefficients of the second transmission mechanism 122 is desired.

Figure 5:
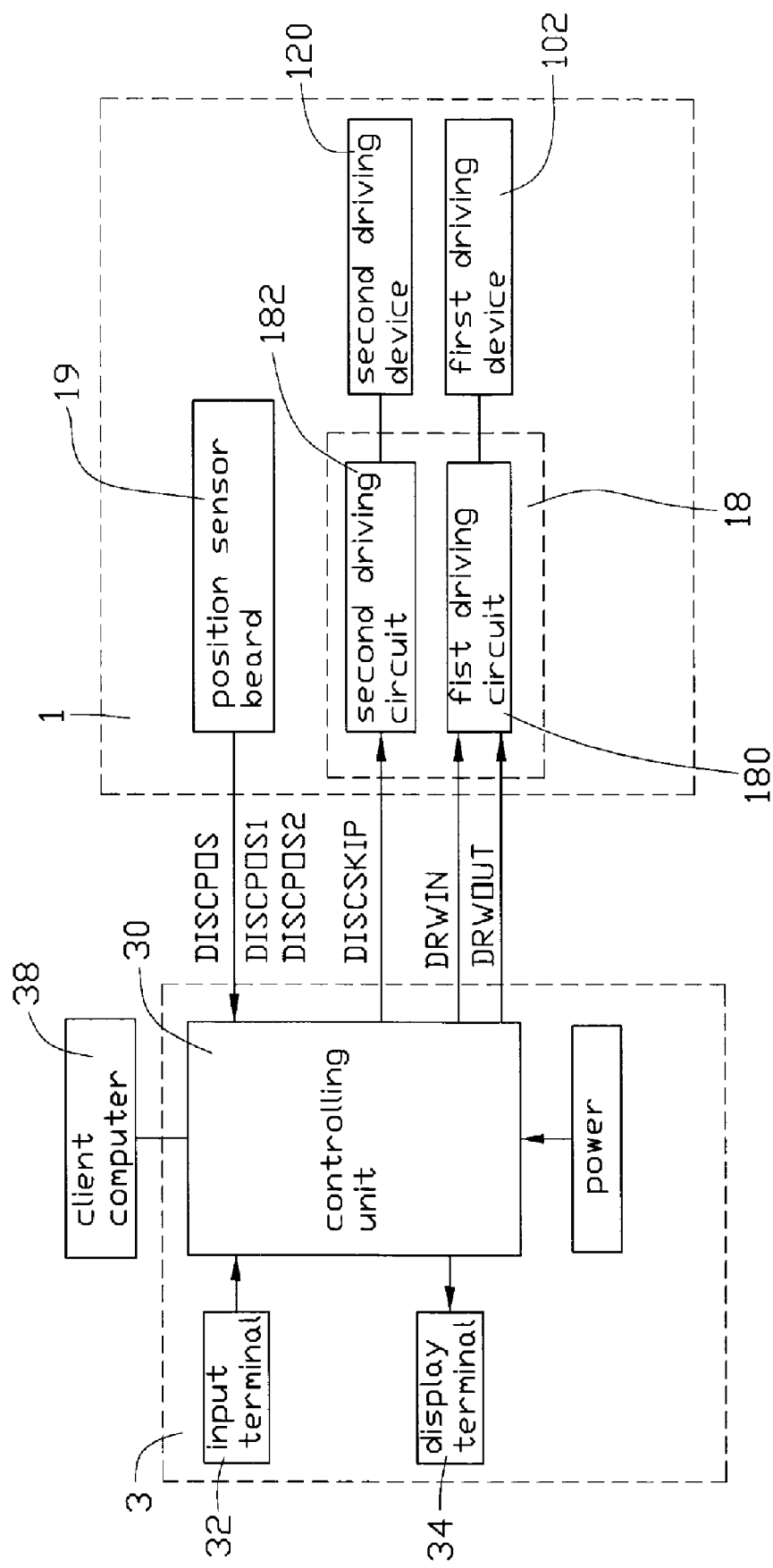
FIG. 5 is a block diagram of a multi-disc player testing apparatus in accordance with a preferred embodiment, the multi-disc player testing system including a controlling unit.

Referring to FIG. 5, a block diagram of a multi-disc player testing apparatus 3 in accordance with a preferred embodiment is illustrated. The multi-disc player testing apparatus 3 includes a controlling unit 30, an input terminal 32, and a display terminal 34. The controlling unit 30 can be a micro controller unit (MCU), and is used for controlling the drawer 12 to move toward and/or away from the base 10, controlling the carousel 14 to rotate, and measuring the wave pulses 2 outputted from the positioning sensor board 19. The controlling unit 30 connects to the positioning sensor board 19 to receive the signals DISPOS, DRWPOS1 and DRWPOS2 from the positioning sensor board 19. The controlling unit 30 connects to the first and second driving circuits 180 and 182, and outputs the commands DRWIN and DRWOUT to the first driving circuit 180 and the command DISCSKIP to the second driving circuit 182.

The input terminal 32 can be a keyboard, a mouse or other input units. Via the input terminal 32, input commands such as OPEN, CLOSE, UP, STEP or CONT can be entered. When receiving the input command OPEN, the controlling unit 30 generates command DRWOUT to be sent to the first driving circuit 180. When receiving the input command ClOSE, the controlling unit 30 generates command DRWIN to be sent to the first driving circuit 180. When receiving the input command UP, the controlling unit 30 controls the multi-disc player 1 to lift up the traverse module 100 so that the traverse module 100 can support the current disc 16 accommodated in the carousel 14. When receiving the input command STEP, the controlling unit 30 controls the carousel 14 to rotate a predetermined angle (hereinafter referred to as single step), so that the disc next to the current disc rotates to the reproducing position. When receiving the input command CONT, the controlling unit 30 controls the carousel 14 to rotate continuously.

The display terminal 34 connects to the controlling unit 30 for displaying testing result outputted from the controlling unit 30. The controlling unit 30 can be connected to a client computer 38 (for example, a general computer). The above-mentioned input commands can be entered through the client computer 38, and the testing result can be output to the client computer 38.

Figure 6:
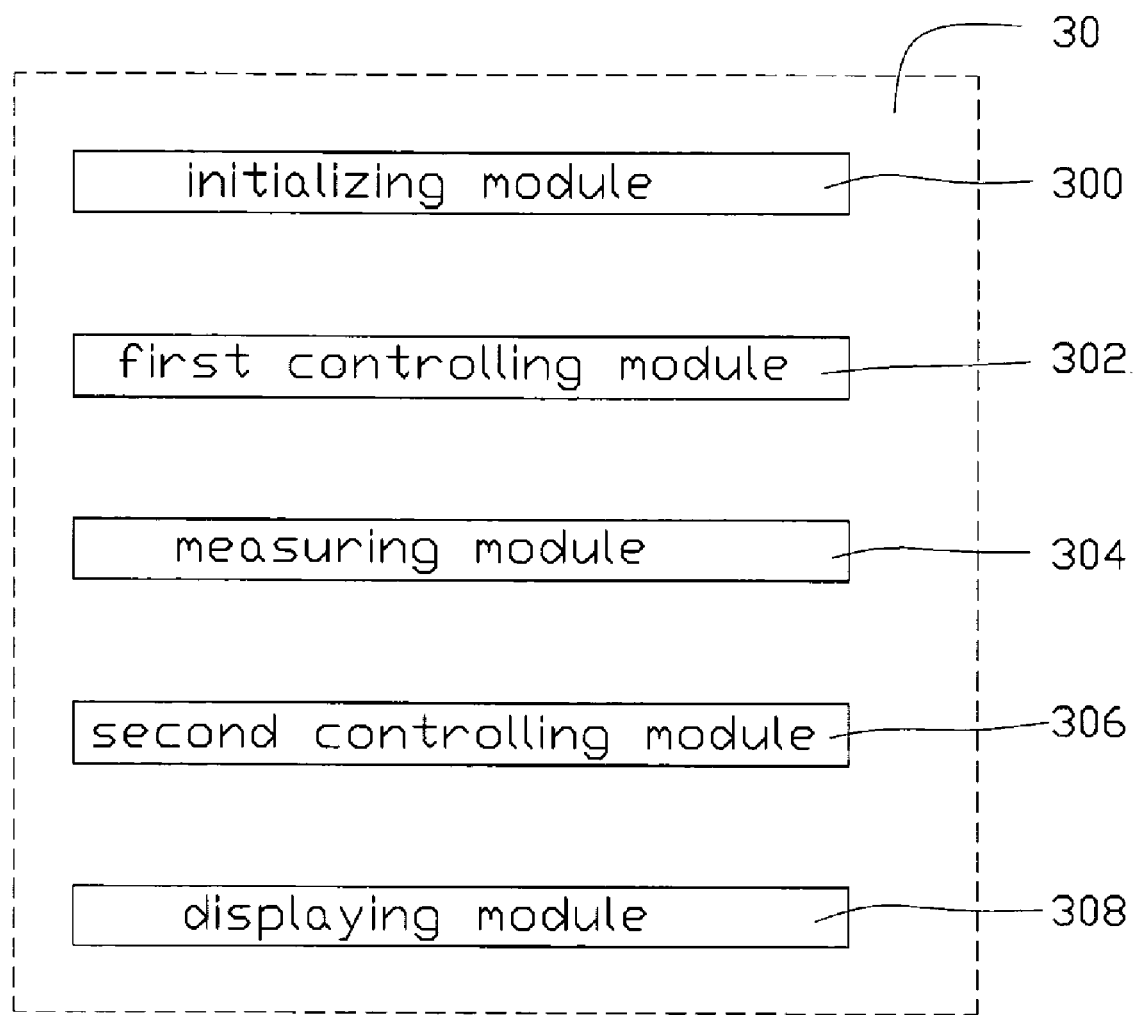
FIG. 6 is a detailed block diagram of the controlling unit.

Referring to FIG. 6, a detailed block diagram of the controlling unit 30 is illustrated. The controlling unit 30 includes an initializing module 300, a first controlling module 302, a measuring module 304, a second controlling module 306, and a displaying module 308. The initializing module 300 is used for performing initializing operations. The initializing operations can include, but not limited to, moving the drawer 12 to the open position, and lifting the traverse module 100 up to support the current disc. The first controlling module 302 is used for outputting the command DISCSKIP. The command DISCSKIP can be a pulse sequence consisted of either positive pulses or negative pulses. When the DISCSKIP is set to a first value like "1", the pulse is positive. When the positive pulse is transmitted to the second driving circuit 182, the second driving circuit 182 supplies power to the second driving device 120. When the DISCSKIP is set to a second value like "0", the pulse is negative. When the negative pulse is transmitted to the second driving circuit 182, the second driving circuit 182 cuts off power supplied to the second driving device 120.

The first controlling module 302 controls durations of the positive pulses that determines whether the second driving circuit 182 controls the second driving device 120 to drive the carousel to rotate a single step or to rotate continuously. For example, when the command DISCSKIP is a pulse sequence consisted of continuous of positive pulses, the second driving circuit 182 supplies continuous power to the second driving device 120. The second driving device 120 drives the carousel 14 to rotate at a uniform or at an accelerated speed. When the command DISCSKIP is a pulse sequence consisted of alternate positive pulses and negative pulses, the driving circuit 182 supplies intermittent power to the second driving device 120.

The measuring module 304 is used for receiving the wave pulses outputted from the disc-positioning sensor 194, measuring numbers, durations of low phrase pulses 22, and comparing the measured numbers and durations of the low phrase pulses 22 with predetermined values to determine whether the multi-disc player 1 satisfies the specific requirements. When the carousel 14 rotates a single step and the multi-disc player 1 is determined not satisfactory to the specific requirements, the reasons may rest with the characteristics of the brake system or the features of the carousel 14. When the carousel rotates continuously and the multi-disc player 1 is determined not satisfactory to the specific requirements, the reasons may rest with the friction coefficients or the features of the carousel 14.

The second controlling module 306 is used for controlling the first driving circuit 180 to control the first driving device 102 to drive the drawer 12 to move towards or away from the base 10. The second controlling module 306 is used for controlling the driving circuit board 18 to lift up the traverse module 100 when receiving the input command UP from the input terminal 32.

The displaying module 308 is used for controlling the display terminal 34 to display measuring result from the measuring module 304.

Figure 7:
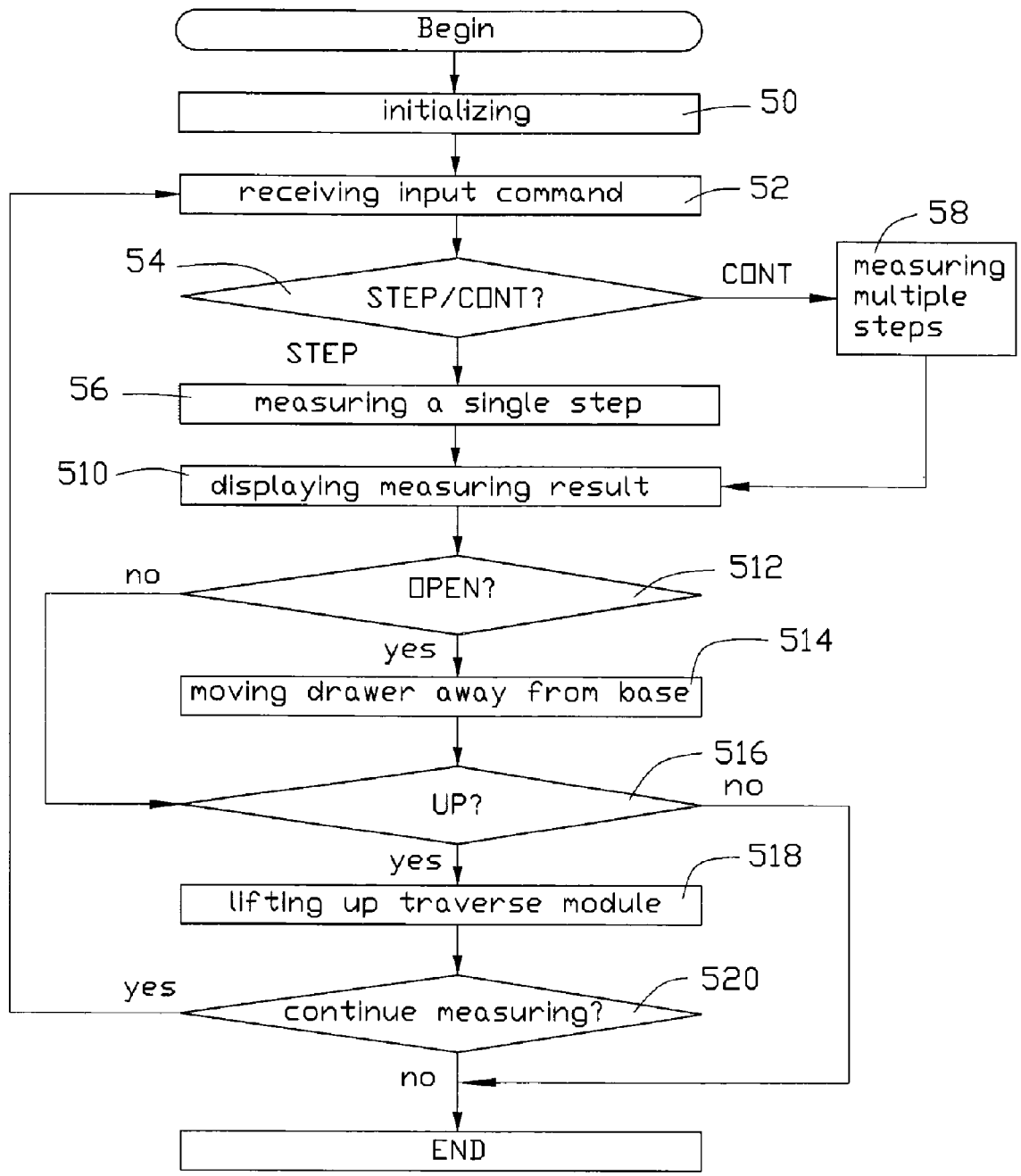
FIG. 7 is a flow chart illustrating a testing procedure of the multi-disc player testing apparatus of FIG. 5.

Referring to FIG. 7, a testing procedure of the multi-disc player testing apparatus 3 is illustrated. The testing procedure begins at step 50, where the initialing module 300 performs initializing operations. The initializing operations returns the drawer to a closed position, aligns one of the disc-accommodating area 140 with the traverse module 100, and lifts up the traverse module 100 to support the disc 16 accommodated in the one of the disc-accommodating area 140. Then, the procedure proceeds to step 52, where the controlling unit 30 receives input commands from the input terminal 32. In step 54, a determination is made as to whether the input command received in step 52 is a STEP or a CONT. If the input command is the STEP, the first controlling module 302 controls the second driving circuit 182 to control the second driving device 120 to drive the carousel 14 to rotate a single step. The disc-positioning sensor 194 scans the indicating slots 144 of the carousel 14 to obtain wave pulses. The measuring module 304 measures the numbers and durations of the low phrase pulses 22 included in the wave pulses (step 56).

If the input command is the CONT, the first controlling module 302 controls the second driving circuit 182 to control the second driving device 120 to drive the carousel 14 to rotate continuously. That is, the carousel 14 rotates multiple steps. The disc-positioning sensor 194 scans the indicating slots 144 of the carousel 14 to obtain wave pulses. The measuring module 304 measures the numbers and durations of the low phrase pulses included in each portion of the wave pulses (step 58). The measuring module 304 then compares the measured numbers and durations with predetermined values to determine whether the multi-disc player satisfies the specific requirements.

After measuring operations in step 56 and/or step 58, the testing procedure proceeds to step 510, the displaying module 308 controls the display terminal 34 to display the measuring result. Then, in step 512, a conclusion is made as to whether the input command OPEN is entered. If the input command OPEN is entered, the second controlling module 306 outputs the command DRWOUT to be sent to the second driving circuit 182. The second driving device 120 thus drives the drawer 12 to move away from the base 10 (step 514). Then, in step 516, another conclusion is made as to whether the input command UP is entered. If the input command UP is entered, the second controlling module 306 controls the driving circuit board 18 to lift up the traverse module 100 (step 518). Finally, a conclusion is made as to whether it is needed to continue measuring. If it is needed to continue measuring, the testing procedure returns to step 52. If it is not needed to continue measuring, the testing procedure is ended.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A multi-disc player testing apparatus for testing a multi-disc player which includes a carousel having multiple disc-accommodating areas and a disc-positioning sensor, the carousel defining a plurality of indicating slots for identifying each disc-accommodating area, the disc-positioning sensor scanning the indicating slots to produce wave pulses in a form corresponding to the indicating slots, the multi-disc player testing apparatus comprising a measuring module for receiving the wave pulses from the disc-positioning sensor, and measuring and comparing the number of the pulses and durations of each pulse with predetermined values to determine whether the multi-disc player satisfies specific requirements.

2. The multi-disc player testing apparatus as claimed in claim 1, further comprising a first controlling module, the first controlling module being provided for generating controlling commands based on input commands from an input terminal to be sent to the multi-disc player to control the carousel to rotate.

3. The multi-disc player testing apparatus as claimed in claim 2, wherein the controlling commands is a pulse sequence, durations of the pulse sequence controlling rotation of the carousel.

4. The multi-disc player testing apparatus as claimed in claim 3, further comprising a second controlling module for controlling a drawer of the multi-disc player to move between a closed position and an open position.

5. The multi-disc player testing apparatus as claimed in claim 1, further comprising a display terminal for displaying measuring result.

6. A multi-disc player testing method comprising:
- receiving wave pulses from a disc-positioning sensor of a multi-disc player, the wave pulses representing features of a disc-accommodating area of a carousel and consisted of alternate high phrase pulse and low phrase pulse;
- measuring the number of the low phrase pulses and durations of each low phrase pulse; and
- comparing the number and durations with predetermined values to determine whether the multi-disc player satisfies specific requirements.

7. The multi-disc player testing method as claimed in claim 6, further comprising a step of controlling the carousel to rotate a single step to receive wave pulses.

8. The multi-disc player testing method as claimed in claim 6, further comprising a step of controlling the carousel to continuously rotate multiple steps to receive wave pulses.

9. The multi-disc player testing method as claimed in claim 6, further comprising a step of controlling a drawer to move between a closed position and an open position.

10. The multi-disc player testing method as claimed in claim 6, further comprising a step of displaying measuring result through a display terminal.

11. A multi-disc player testing method for testing a multi-disc player, the multi-disc player comprising a carousel having multiple disc-accommodating area, the multi-player disc player testing method comprising:
- rotating a first disc-accommodating area of the carousel to a reproducing position;
- rotating the carousel to bring a second disc-accommodating area to the reproducing position;
- receiving wave pulses from a disc-positioning sensor of the multi-disc player, the wave pulses indicating features of the disc-accommodating areas and consisted of alternate high phrase pulse and low phrase pulse, each low phrase pulse corresponding to an indicating slot defined in the carousel;
- measuring the number of low phrase pulses and durations of each low phrase pulse; and
- comparing the measured number and durations with predetermined values to determine whether the multi-disc player satisfies specific requirements.

12. The multi-disc player testing method as claimed in claim 11, wherein the carousel rotates in a sharp angle, and the second disc-accommodating area is next to the first disc-accommodating area, and the wave pulses indicating features of the second disc-accommodating area.

13. The multi-disc player testing method as claimed in claim 12, wherein when the multi-disc player is determined unsatisfied, the reasons rests with one of friction coefficients of a transmission mechanism of the multi-disc player, a brake system of the multi-disc player, and configurations of the indicating slots are not conformable to specific requirements.

14. The multi-disc player testing method as claimed in claim 11, wherein the carousel rotates more than one cycle, and the wave pulses indicating features of all the disc-accommodating areas.

15. The multi-disc player testing method as claimed in claim 14, wherein when the multi-disc player is determined unsatisfied, the reasons rests with one of friction coefficients of a transmission mechanism of the multi-disc player, and configurations of the indicating slots are unsatisfied.

16. The multi-disc player testing method as claimed in claim 15, further comprising a step of displaying measuring and comparing result.

* * * * *

UNITED STATES PATENT AND TRADEMARK OFFICE
CERTIFICATE OF CORRECTION

PATENT NO. : 7,596,060 B2  Page 1 of 1
APPLICATION NO. : 11/308613
DATED : September 29, 2009
INVENTOR(S) : Li-Dong Li It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 840 days.

Signed and Sealed this

Twenty-eighth Day of September, 2010

David J. Kappos
*Director of the United States Patent and Trademark Office*